Figure 1:
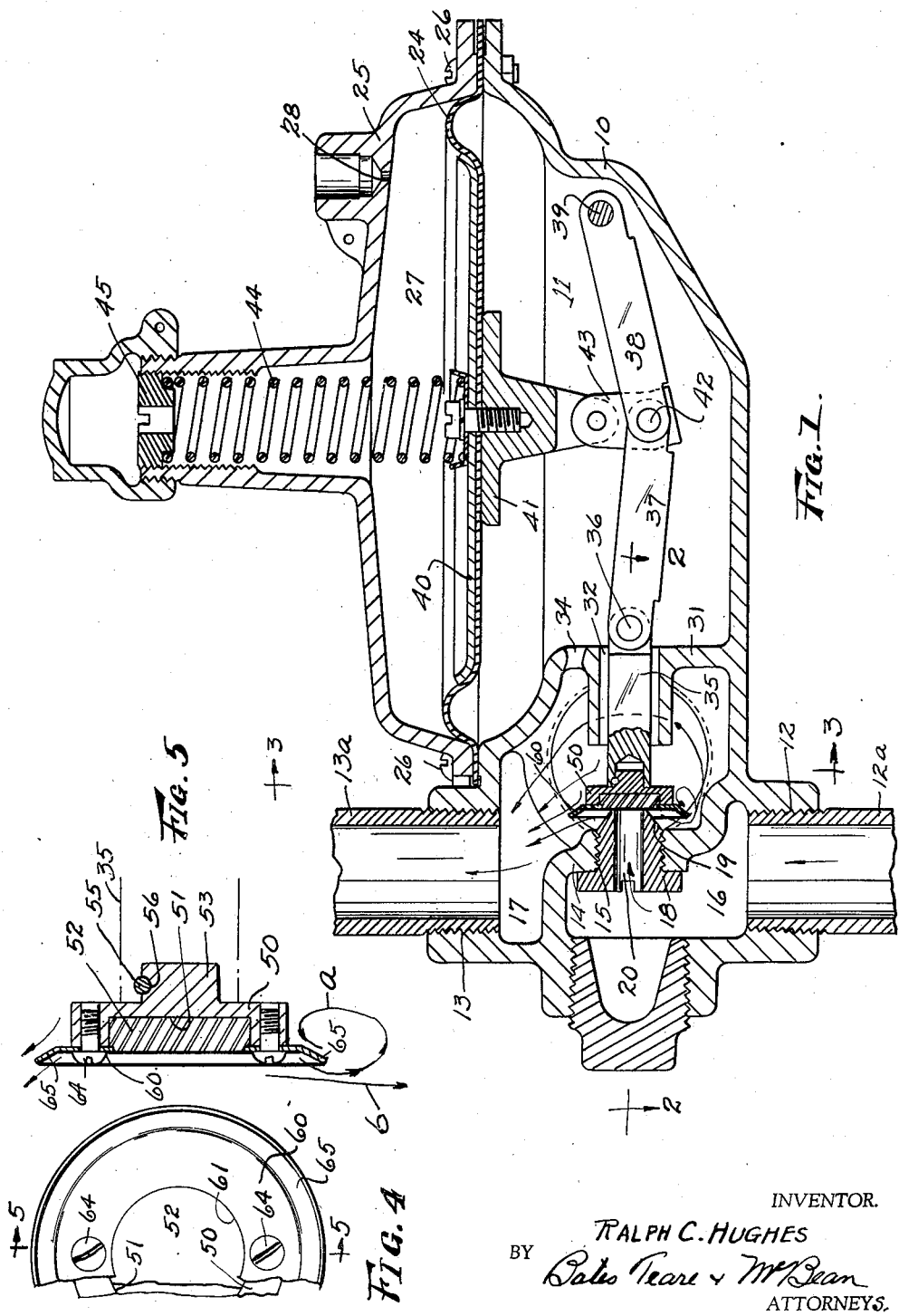

March 30, 1943.   R. C. HUGHES   2,315,370
FLUID PRESSURE REGULATOR
Filed July 31, 1940   3 Sheets-Sheet 1

INVENTOR.
RALPH C. HUGHES
BY
ATTORNEYS.

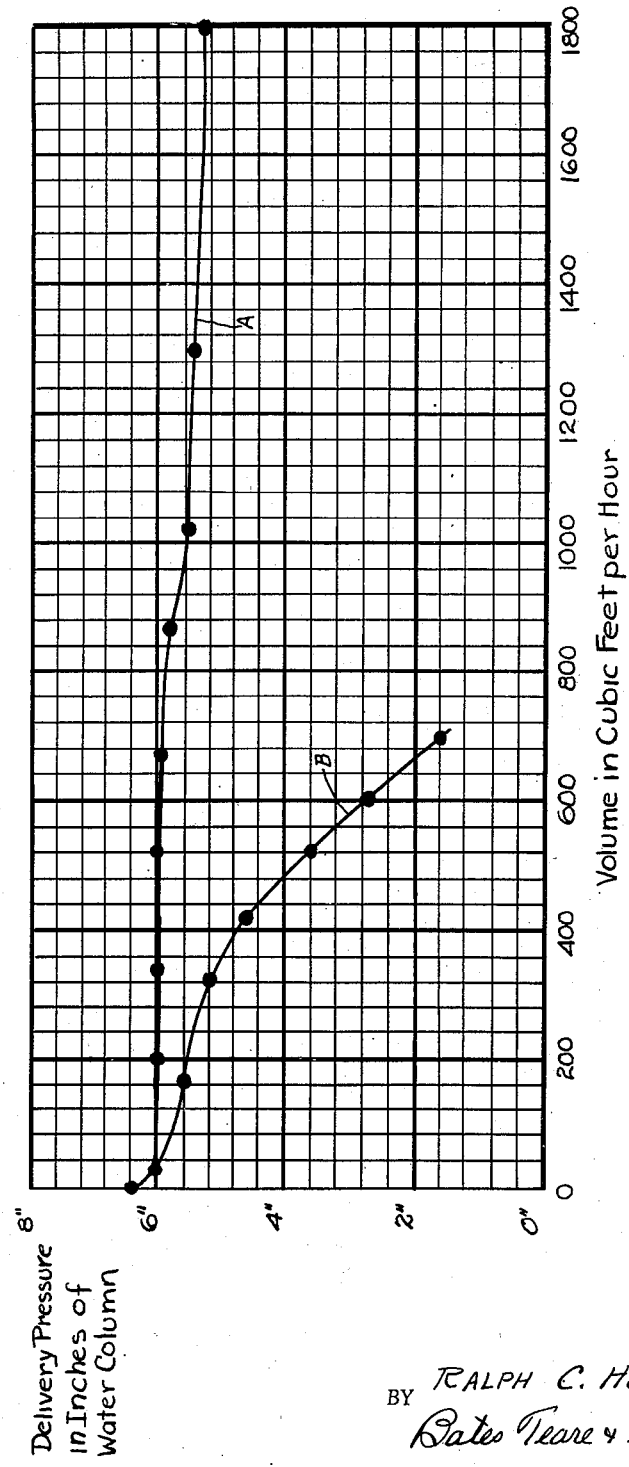

Patented Mar. 30, 1943

2,315,370

UNITED STATES PATENT OFFICE 2,315,370

FLUID PRESSURE REGULATOR

Ralph C. Hughes, Anderson, Ind., assignor to Reynolds Gas Regulator Co., Anderson, Ind., a corporation of Indiana Application July 31, 1940, Serial No. 348,881

3 Claims. (Cl. 50—26)

This invention relates to a fluid pressure regulator and especially to a pressure regulator for use with gas appliances where comparatively high capacities are required, but where the space available limits the size of the regulator. This, therefore, is the general object of the present invention.

Gas regulators generally comprise a valve body having two chambers, one a valve chamber and the other a regulating chamber. The valve chamber is provided with inlet and outlet openings, which are separated by a partition wall having a valve port. The valve port is opened and closed by a valve member, the position of which is controlled by a pressure responsive member, mounted within the regulating chamber and connected with the valve member. In such pressure regulators, the pressure on the outlet side of the valve member acts on the diaphragm to control the distance between the valve member and the valve port.

One method of increasing the capacity of a gas regulator has been to provide a suction tube which projects from the regulating chamber into the stream of gas flowing from the outlet side of the valve port. The object of this tube is to reduce the pressure under the diaphragm as the rate of flow of gas through the regulator increases, and thereby cause the valve to open, at least to some degree, and in proportion to the volume of gas flowing through the regulator. Such methods rely upon an increased movement of the valve member away from the valve port to increase the capacity, and while this to some extent aids the maintenance of a higher regulator output pressure at higher rates of flow, it does not materially increase the maximum volumetric flow capacity of the regulator.

I have found that the decrease in outlet pressure is caused by two main factors, one of these is the fact that the pressure in the valve and regulator chambers increases as the rate of flow through the valve chamber increases. The other is the fact that the flow of gas in the valve chamber sets up eddy currents which throttle or restrict the stream of gas flowing from beneath the valve member.

It is an object of this invention to provide a fluid regulator which will overcome the above mentioned disadvantages. To accomplish this, I so arrange the valve member that it will divert the flow of gas away from the regulating chamber and at the same time also divert the eddy currents in such a manner as to prevent the restriction of the stream of gas flowing from beneath the valve member. By controlling these eddy currents, I find that I secure a given volumetric flow with the valve member positioned closer to the valve port than has been done for the same flow in the past. Obviously, this materially increases the maximum capacity of the regulator.

Other features of my invention will become more apparent from the following description, reference being had to the accompanying drawings in which I illustrate a preferred embodiment of the invention.

Figure 2:
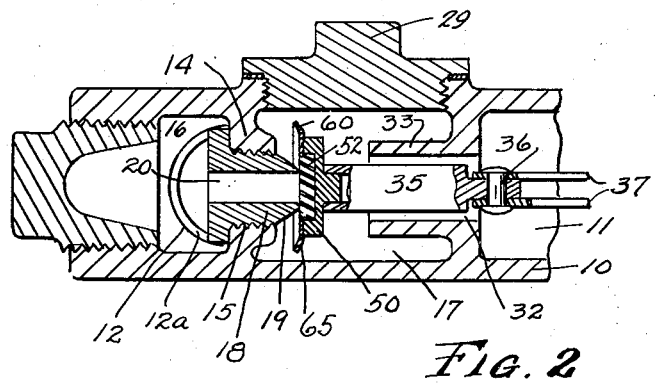
Figure 3:
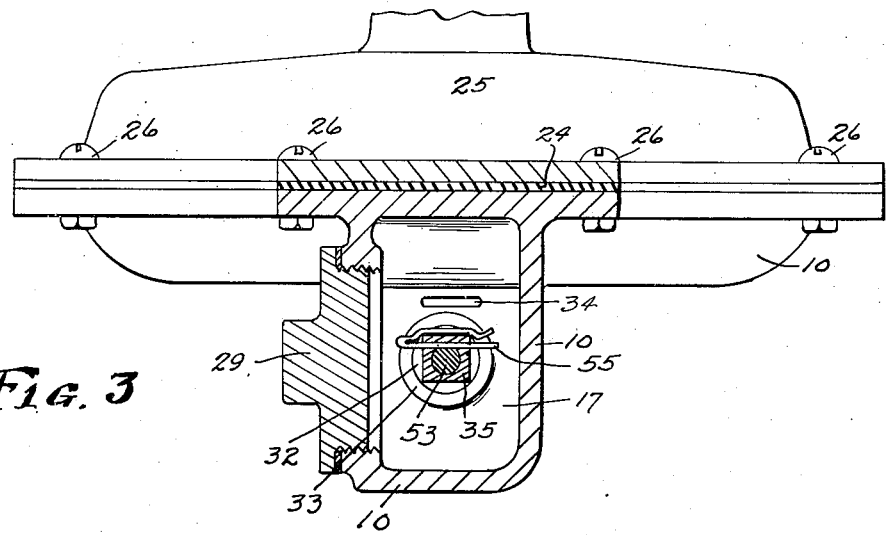

In the drawings, Fig. 1 is a central vertical section through a regulator embodying my invention; Figs. 2 and 3 are fragmentary sectional views through the regulator as indicated by correspondingly numbered lines on Fig. 1; Fig. 4 is a fragmentary bottom plan view of a valve member; Fig. 5 is a sectional view of the valve member as indicated by the lines 5—5 on Fig. 4, and Fig. 6 is a diagram or chart illustrating the differences between results obtained with my improved regulator and valve member as contrasted with results obtained with structures used in the past.

The regulator shown in the drawings comprises a body 10 having a valve chamber at one end thereof and a regulating chamber 11 at the other end. The valve chamber has an inlet opening 12 and an outlet opening 13. The walls of these openings are preferably threaded to receive the usual gas line conduits 12a and 13a. The inlet and outlet openings are separated by a partition wall 14, having a valve port opening 15 extending therethrough, the axis of which extends at right angles to the axes of the inlet and outlet openings. The partition 14 divides the valve chamber into an inlet chamber and outlet chamber 16 and 17 respectively. A valve seat member 18 is threadingly secured into the valve seat opening and is provided with a conical end 19 which projects some distance beyond the partition 14 into the outlet chamber 17, to provide a comparatively sharp valve seat and facilitate the use of a valve member to be hereinafter described. This valve seat member is provided with a suitable axial opening 20 through which the gas passes from the inlet to the outlet chamber.

The regulating chamber 11 is closed at its top by a flexible diaphragm 24 which is held in place by a cap or cover 25, the latter being secured to the body 10 by screws 26, which pass through flanges in both members as well as through the diaphragm. The space between the diaphragm and cover 25 provides a breather or atmospheric chamber 27. This chamber is vented to atmosphere by a suitable vent orifice 28.

The regulating chamber 11 is separated from the outlet chamber 17 by a partition wall 31 which is substantially parallel with that region of the partition wall 14 which carries the valve seat member 18. The partition 31 is provided with an opening 32 in alignment with the valve seat opening 20, and a valve stem 35 is slidably mounted in this opening for movement toward and from the valve seat. Pivotally connected to the valve stem 35 within the regulating chamber, as at 36, is one link 37 of a toggle mechanism. The other link 38 of this toggle mechanism is pivoted to the body 10 as at 39.

The diaphragm 24 is clamped between a pair of clamping plates 40 and 41, the lower one, 41, of which is connected by a link 43 to the pivotal connection 42 between the two toggle links 37 and 38. An initial or regulating load is placed on the diaphragm 24 by a spring 44. This spring is interposed between an adjustable nut 45 carried by the cover 10 and the upper diaphragm clamping plate 40.

The valve member, with which the present invention is particularly concerned, comprises a cylindrical body 50 having a recess 51 in one face thereof adapted to receive a seat-engaging disc 52. This disc is preferably made of a composition rubber, leather, or some similar material. The other face of the valve member 50 is provided with a valve stem connecting member 53. As shown, the connecting member 53 is arranged to be inserted within an axial bore in the valve stem 35 and to be secured thereto by a cotter pin 55, one arm of which passes through a suitable transverse opening in the valve stem and engages a slot 56 in a connecting member, while the other arm serves to embrace the stem 35 and removably retain the pin in position.

To facilitate removal or replacement of the valve member, the side wall of the valve chamber is provided with an opening of sufficient size to permit passage therethrough of the valve member. This opening is normally closed by a plug 29 which has a threaded engagement with the walls of the body opening.

The valve member 50 is provided with a flow diverting plate 60. This plate is made of comparatively thin sheet metal. I find that a metal of from five to thirty thousandths of an inch in thickness is suitable. The thickness of the metal as will be seen, depends to a certain extent upon the inlet pressure for which the regulator is designed to be used. The diverter plate 60 is provided with a central opening 61 through which a portion of the seat contacting washer 52 projects. The opening 61 in the diverting plate 60 is slightly smaller than the washer so that the plate will serve to retain the washer in position in the valve member 50. As shown, the plate 60 is secured to the valve member 50 by screws 64. These may, if desired be countersunk in the plate and valve member, so as to provide a planar surface. In most instances, this however, is not essential. The arrangement of the diverting plate 60 and washer 52 is such that the outer surface of the washer will lie flush with the outer surface of the plate 60 to provide an uninterrupted surface along which the gas may flow.

The diverting plate 60 as illustrated is in the form of a disc and is about one third larger in diameter than the valve member and its diameter is about three times that of the inlet port opening. However, I find that the diameter of the diverting disc 60 may be from three to ten times the diameter of the opening 20 in the valve seat, and at the same time secure highly beneficial results. The disc should, however, be greater in diameter than the diameter of the valve member. For the best results, the disc is preferably larger in diameter than the diameter of the opening 32 in the partition 31 through which the valve stem 35 extends.

The diverter plate 60 as above described prevents the flow of gas from the valve seat opening 20 along the sides of the valve stem into the regulating or diaphragm chamber. The boss 32a, which projects from the partition 31 into the valve chamber and through which the valve stem 35 extends, prevents gas flowing along the walls of the inlet chamber from flowing directly into the regulating chamber. Furthermore, eddy currents of gas, such as that indicated at $a$ in Fig. 5 which strike the cylindrical surface of the valve or valve stem and which follow the side wall of the valve downward toward the seat engaging surface are prevented from impinging directly upon the stream of gas $b$ flowing outward from beneath the valve member. Instead, the eddy currents $a$ are diverted outwardly in streams substantially parallel with the main stream of gas $b$ flowing from beneath the valve member.

The diverting disc as shown in Figs. 1 and 5 extends outwardly from the cylindrical wall of the valve member 50 a short distance and then is dished or bent in a general direction toward the outlet opening 13 of the regulator. As illustrated, the diverter plate is bent at an angle of substantially thirty degrees from the plane of its surface. This, I find, diverts the stream of gas as well as the eddy current toward the regulator outlet.

In tests made upon regulators provided with diverter equipped valve members and non-diverter equipped valve members with the same inlet pressure and the same given rate of flow through the regulator, those equipped with diverter plates show a marked increase in pressure at the outlet opening of the regulator over non-equipped regulators. Often this increases more than one hundred percent. Such tests also show an unexpected presence of twenty percent or more higher pressure under the diaphragm in diverter equipped regulators than in the non-diverter equipped regulators. The same rate of flow is obtained in the diverter equipped regulators with the valve member closer to the valve seat than in non-equipped regulators. This is a material factor in increasing the maximum capacity of the regulators.

In Fig. 6, I illustrate a diagram or chart which indicates the difference between the results obtained with the improved regulator and those of the prior art, for instance, a regulator having a cylindrical valve member not equipped with a diverter plate. In this chart, the horizontal lines indicate delivery pressure in inches of water column, while the vertical lines illustrate the volume, in cubic feet per hour of gas flowing through the regulator. In this specific illustration, substantially identical regulators were used. One was equipped with the improved valve member and the non-improved valve member. Both regulators were adjusted for six inches of water column delivery pressure when passing twenty-five cubic feet of gas per hour. The inlet pressure in both instances was fifty pounds per square inch. The test shown in the chart was made for a specific condition where the maximum capacity of the regulator was determined by a permissible drop in outlet pressure of eight tenths of an inch of water column. The curve A represents the test made on the improved regulator, and it will be noted that its maximum capacity, based on an eight tenths of an inch drop in pressure, was eighteen hundred cubic feet per hour, whereas, the same drop in pressure on the line indicated B, which represents the test made on the prior art regulator, occurred at approximately two hundred and eighty five cubic feet an hour. Thus, the maximum capacity of the improved regulator is substantially six times that of the prior comparable regulators.

I claim:

1. In a gas regulator, a valve body having a valve chamber provided with inlet and outlet openings, and a regulator chamber, a partition wall in said valve chamber separating the inlet and outlet opening and having a valve port opening extending therethrough surrounded by a valve seat, a pressure responsive member in said regulator chamber, a valve member in said valve chamber, a second partition wall between said valve and inlet chambers and having an opening extending therethrough, a connection between the pressure responsive member and said valve member passing through the opening in said last named partition, said valve member having a seat contacting surface, and means for preventing the flow past the valve and eddy currents from affecting the operation of the diaphragm, said means comprising a relatively thin deflector plate secured to said valve member with one surface thereof in substantially the same plane as the plane of the port contacting surface of said valve member, and extending edgewise beyond the sides of the valve member, and wherein the deflector is provided with a peripheral flange bent out of the plane of its surface at an acute angle, the diameter of said plate being from three to ten times the diameter of the valve port openings.

2. In a gas regulator, a valve body having a valve chamber, provided with inlet and outlet openings, and a regulator chamber, a partition wall in said valve chamber separating the inlet and outlet opening and having a valve port opening extending therethrough, surrounded by a valve seat, a pressure responsive member in said regulator chamber, a valve member in said valve chamber, a second partition wall between said valve and inlet chambers and having an opening extending therethrough, a connection between the pressure responsive member and said valve member passing through the opening in said last named partition, said valve member having a seat contacting surface, and means for preventing flow past the valve and eddy currents from affecting the operation of the diaphragm, said means comprising a deflector plate secured to said valve member with one surface thereof in substantially the same plane as the plane of the port contacting surface of said valve member, and extending edgewise beyond the sides of the valve member, and wherein the edges of said deflector plate are bent out of the plane of its surface in a direction to divert gas flowing thereacross away from the opening in said last named partition.

3. A gas pressure regulator comprising a casing having a chamber provided with inlet and outlet openings, said chamber being separated into inlet and outlet chambers respectively by a wall having a valve port opening, the axis of said opening being transverse to the axis of said inlet and outlet openings whereby gas flows transverse to the axis of the valve port to reach the outlet opening, said casing also being provided with a regulating chamber having a pressure responsive diaphragm extending thereacross, said regulating chamber being separated from the outlet chamber by a wall provided with an opening in axial alignment with the valve port opening and providing a pressure communication between said chambers, a valve stem extending through the opening in said last-named wall and connected to the diaphragm for actuation thereby, a valve member carried by said stem and provided with a non-metallic planar surface arranged and adapted to coact with said valve port opening to control the flow of gas therethrough, and means for preventing flow past the valve and eddy currents from affecting the operation of the diaphragm, said means comprising a thin metallic deflector disc secured to said valve member and extending outward therefrom, said disc having a surface coplanar with said planar valve member surface and having an annular flange bent out of the plane of such surface at an acute angle toward the valve port opening, said disc being larger in diameter than the opening through which the valve stem projects and being spaced from the walls of said casing to permit the gas to flow therebetween, both faces of said flange being arranged and adapted to divert gas flowing through the said casing toward the outlet opening and wherein the thickness of the plate is such as to present substantially no obstruction to the transverse flow of gas through said casing toward the outlet port.

RALPH C. HUGHES.